United States Patent [19]

Yu et al.

[11] Patent Number: 5,350,806
[45] Date of Patent: Sep. 27, 1994

[54] METAL HYDROXIDE ADDITIVES FOR POLY(ARYLENE SULFIDE)

[75] Inventors: Michael C. Yu; William H. Beever, both of Bartlesville, Okla.

[73] Assignee: Phillips Petroleum Company, Bartlesville, Okla.

[21] Appl. No.: 815,091

[22] Filed: Dec. 27, 1991

[51] Int. Cl.$^5$ .............................. C08L 81/00
[52] U.S. Cl. .................... 525/189; 524/433; 525/537
[58] Field of Search ............... 525/189, 537; 524/433

[56] References Cited

U.S. PATENT DOCUMENTS

| | | | |
|---|---|---|---|
| 4,395,512 | 7/1983 | Kubota et al. | 524/413 |
| 4,581,411 | 4/1986 | Liang et al. | 525/189 |
| 4,628,072 | 12/1986 | Shiraki et al. | 525/57 |
| 4,746,698 | 5/1988 | Kouyama et al. | 524/396 |
| 4,826,906 | 5/1989 | Satake et al. | 524/381 |
| 4,889,893 | 12/1989 | Kobayashi et al. | 528/189 |
| 4,898,904 | 2/1990 | Yu et al. | 524/433 |
| 5,087,666 | 2/1992 | Yu et al. | 525/189 |

FOREIGN PATENT DOCUMENTS 1255950  11/1986  Japan ................. 524/433

Primary Examiner—Melvyn I. Marquis
Assistant Examiner—Helen F. Lee
Attorney, Agent, or Firm—Ryan N. Cross

[57] ABSTRACT

A composition and method for forming the composition of poly(arylene sulfide) having improved impact strength and crack resistance. The invention involves mixing poly(arylene sulfide) with a polymeric rubber, a metal hydroxide, and a carboxylic anhydride, each in sufficient amounts and in proportions needed to improve impact strength and crack resistance.

16 Claims, No Drawings

METAL HYDROXIDE ADDITIVES FOR POLY(ARYLENE SULFIDE)

This invention relates to compositions containing poly(arylene sulfide). In one of its aspects, this invention relates to molding compositions containing poly(arylene sulfide). In another of its aspects, this invention relates to a method for preparing compositions of poly(arylene sulfide) having improved impact strength and crack resistance.

Poly(arylene sulfide) is known to be useful as a molding composition. Among the characteristics of a molding composition that are important in determining the overall usefulness of the composition are the impact resistance or impact strength and the crack resistance. Molding compositions having good impact strength can be used in the molding of a great number of useful objects in which molding compositions that do not have good impact strength cannot be used because without good impact strength the molded objects tend to chip, crack or break when impacted with another object. Crack resistance is especially important in the molding of thick objects.

It is therefore an object of this invention to provide a method for improving the impact strength and crack resistance of compositions containing poly(arylene sulfide), especially poly(phenylene sulfide). It is another object of this invention to provide compositions containing poly(arylene sulfide), especially poly(phenylene sulfide) which have improved impact strength and crack resistance.

Other aspects, objects and the various advantages of this invention will become apparent upon reading the specification and the appended claims.

According to this invention, the impact strength and crack resistance of compositions containing poly(arylene sulfide) can be improved by combining the poly(arylene sulfide) with a polymeric rubber, a metal hydroxide, and a carboxylic anhydride, each in sufficient amounts and in the proportions needed to improve impact strength and crack resistance.

In an embodiment of the invention, a method is provided for improving the impact strength and crack resistance of the composition containing poly(arylene sulfide) by mixing with the poly(arylene sulfide) a polymeric rubber, a metal hydroxide, and a carboxylic anhydride, each in sufficient amounts and in proportions needed to improve impact strength and crack resistance to form a PAS-rubber mixture and then meltblending the PAS-rubber mixture.

The term "poly(arylene sulfide) resin" is used herein to broadly designate arylene sulfide polymers whether homopolymers, copolymers, terpolymers, and the like, or a blend of such polymers. Poly(arylene sulfide) resins which are suitable for use in accordance with the present invention are those described in U.S. Pat. No. 3,354,129 issued Nov. 21, 1967; U.S. Pat. No. 4,415,729 issued Nov.15, 1983; U.S. Pat. No. 4,588,789 issued May 13, 1986; U.S. Pat. No. 3,919,177 issued Nov. 11, 1975; U.S. Pat. No. 4,038,261 issued Jul. 26, 1977; and U.S. Pat. No. 4,656,231 issued Apr. 7, 1987, which patents are incorporated herein by reference. The resins are normally solid materials which in an uncured or partially cured state can have melt flows according to ASTM Method D1238-70, Procedure B (316° C., and 5 kg load and a 0.17 mm diameter orifice), ranging from about 10 g/10 minutes to about 10,000 g/10 minutes, more preferably from about 20 g/10 minutes to 1000 g/10 minutes.

The presently preferred resin is poly(phenylene sulfide). The preferred commercially available poly(phenylene sulfide) resins are those manufactured by Phillips Petroleum Company of Bartlesville, Okla., and marketed as RYTON ® poly(phenylene sulfide) resins having flow rates in the range of from about 0. 1 g/10 minutes to about 500 g/10 minutes as determined by ASTM D1238-70, Procedure B (as above). From about 0.5 weight percent to about 99.5 weight percent of the composition, more preferably from about 45 weight percent to about 98.5 weight percent of the composition, and most preferably from 70 weight percent to 93 weight percent of the composition can be poly(phenylene sulfide).

As a general rule, the poly(arylene sulfide) resin is one which results from a polymerization phase and a recovery phase, and optionally a washing phase which follows the recovery phase. In the polymerization phase polyhalo-substituted aromatic compounds are reacted with sulfur-containing reactants in a polar organic solvent to produce the resin. By way of a representative example, the polymer can be prepared by reacting an approximately 50% by weight sodium hydroxide aqueous solution with an approximately 60% by weight NaSH aqueous solution to produce an aqueous sodium sulfide solution. A quantity of N-methyl-2-pyrrolidone (NMP) is added to the aqueous sodium sulfide solution and the resulting solution is dehydrated.

To this solution, a suitable modifier can be added. In a particularly preferred embodiment about 0.3 moles of sodium acetate per mole of $Na_2S$ is added to produce a reaction mixture to which a suitable amount of dichlorobenzene (preferably para-dichlorobenzene) is added. The resulting reaction mixture is polymerized preferably by two sequential heating cycles to produce a reaction mixture containing poly(para-phenylene sulfide) resin.

It is currently believed that the use of the two sequential heating cycles produces an apparent increase in the linear molecular weight of the PPS produced from the aforementioned polymerization.

In a preferred embodiment the first of the two heating cycles is at a first temperature, and the second cycle is at a higher temperature. The second, higher temperature cycle is performed immediately after completion of the lower temperature cycle. During the lower temperature cycle, the reaction mixture is heated to a temperature within the range of from about 400° F. to about 460° F. for a time period within the range of about 1 hour to about 6 hours. More preferably, this heating is at a temperature within the range of from about 400° F. to about 440° F. for a time period within the range of from about 3 hours to about 4 hours, and even more preferably the heating occurs at about 440° F. for about 4 hours. In a preferred embodiment the higher temperature cycle is performed so that the reaction mixture is heated to a temperature within the range of from about 500° F. to about 520° F. for a time period within the range of from about 1 hour to about 4 hours. More preferably, the heating during the higher temperature cycle is performed at a temperature of about 510° F. for about 3 hours. After the performance of these two heating cycles, the reaction mixture contains liquid high molecular weight, linear PPS dissolved in NMP.

After the polymerization it is desirable to recover the high molecular weight linear poly(arylene sulfide) resin in a solidified form for ease in removing any by-products. Also, it is the solidified form of the PAS which is typically used in producing articles of manufacture, such as in this case the blends of the present invention. The recovery of the PAS from the polymerization mixture can be performed by any suitable technique which does not degrade the polymer. Currently three techniques are preferred.

One method, includes flash recovering high molecular weight linear PAS. The preferred flash recovery is referred to as non-vent flash recovery. It is commenced after the polymerization without venting the pressure of the reaction vessel where the polymerization was performed. The temperature is increased above the polymerization temperature to start the non-vent flash recovery, and then the reaction mixture is flashed to a vessel at a lower temperature and pressure (such as a ribbon blender at 460° F. and 0.02 psig which is purged with nitrogen). As a result of this non-vent flash recovery the polymer is recovered in a solidified form.

Another recovery technique is referred to herein as NMP quench recovery. This technique broadly includes: (a) sequentially solidifying high molecular weight then low molecular weight linear PAS from the reaction mixture including high molecular weight and low molecular weight PAS by controlled cooling; (b) redissolving low molecular weight linear PAS; and (c) filtering solidified high molecular weight linear PAS from the reaction mixture. In the NMP quench recovery for the previously described particular polymerization example wherein high molecular weight, linear PPS was produced, the reaction mixture from the polymerization after being polymerized at a temperature of about 510° F. can be cooled at about 3° F. per minute to about 470° F., the high molecular weight, linear PPS to solidify into a granular form. Further cooling is continued to reduce pressure within the vessel in which the foregoing processing is done. At about 250° F., low molecular weight species of PPS, referred to often as oligomers, solidify and the remaining liquid tends to become very viscous. To lower the viscosity for facilitating filtering, an appropriate polar organic compound such as NMP is added in large quantities, such as about 3 to about 5 moles per mole of sulfur present. The use of the large amounts of NMP has been found to redissolve solidified oligomers so that the solid PPS that is recovered will contain substantially less of the lower molecular weight oligomers. The separation of the solid from the liquid can be carried out using any suitable known procedure such as screening, centrifuging, or filtration.

The third recovery technique is analogous to the NMP quench technique except that water rather than NMP is used for diluting the reaction mixture.

The PAS particles even after separation from the reaction mixture tend to retain some of the filtrate. If this is to be removed the solid then needs to be processed through a washing step. The washing step can be carried out in any suitable manner. It has been discovered, however, that certain types of washing steps improve characteristics to the recovered PAS resin. Some examples of processes in which washing improves the characteristics of PAS resins are disclosed in U.S. Pat. Nos. 4,588,789; 4,801,664; and 4,877,850, the disclosures of which are incorporated herein by reference. One technique of washing involves the employment of an aqueous acidic treating solution such as disclosed in U.S. Pat. No. 4,801,664. Another technique involves merely water washing. Still another technique involves was with aqueous solutions of the metal salts, oxides, or hydroxides of groups I and IIA of the Periodic Table, such as disclosed in U.S. Pat. No. 4,588,789. It is also within the scope of the present invention to carry out the washing by the use of several of these techniques in sequence, for example, a water wash followed by an aqueous acidic wash followed by a wash with an aqueous alkali metal ion containing solution, and finally with an aqueous solution of a polyvalent metal cation selected from the group consisting of calcium, magnesium, and zinc.

A variety of polyolefin elastomers can be utilized in accordance with the present invention. Generally such elastomers are homopolymers or copolymers derived from alpha-olefins such as ethylene, propylene, butene, isobutene, pantene, methylpantene, hexene, etc. Ethylene-propylene rubber and ethylene-propylene tarpolymer are preferred for use in accordance with this invention with ethylene-propylene tarpolymer being the most preferred.

The term ethylene-propylene tarpolymer (EPDM) refers to copolymer of ethylene, propylene and at least one non-conjugated diene. The preferred non-conjugated dienes used in making the EPDM are linear aliphatic dienes of at least six carbon atoms which have one terminal bond and one internal double bond and cyclic dienes wherein one or both of the carbon-to-carbon double bonds are part of a carboxylic ring. Elastomeric, i.e. rubbery tarpolymer of ethylene, propylene, and 1,4-hexadiene are particularly preferred. Details for the preparation of such EPDH elastomers is disclosed in U.S. Pat. Nos. 2,933,480; 2,962,451; 3,000,866; 3,093,620; and 3,260,708.

The polymeric rubber used in the present invention can be present in an amount from about 0.1 to about 99.5 weight percent; however, it is particularly effective for improving impact strength of poly(phenylene sulfide) when admixed therewith in amounts from about 0.1 to about 40 weight percent, preferably from about 0.5 to about 25 weight percent.

The polymeric rubber preferred for use in this invention is ethylene-propylene diene monomer (EPDM) elastomer.

The carboxylic anhydrides useful in this invention include those with about 3 to 10 carbon atoms with preferably at least one olefinic unsaturation and derivatives thereof. Examples of carboxylic anhydrides include maleic anhydride, norbornene-2,3-dicarboxylic anhydride (Nadic ™ anhydride), methyl-Nadic ™ anhydride, tetrahydrophthalic anhydride, methyltetrahydrophthalic anhydride and mixtures of two or more of these carboxylic anhydrides. The preferred carboxylic anhydride is maleic anhydride. The amount of carboxylic anhydride is in the range of from about 0.05 weight percent to about 5 weight percent, more preferably from about 0.1 weight percent to about 2 weight percent, and most preferably from about 0.1 to about 1 weight percent, based on the total weight of the composition.

The metal hydroxide useful in this invention includes those of monovalent metals of group IA, those of polyvalent metals of group IIA of the Periodic Table and mixtures of two or more of these metal hydroxides, more preferably metal hydroxides of polyvalent metals of group IIA of the Periodic Table and mixtures of two or more of these hydroxides, most preferred is Ca(OH)$_2$. The amount of metal hydroxide useful in this invention is in the range of from about 0.001 weight percent to about 5 weight percent, more preferably from about 0.01 weight percent to about 2 percent, and most preferably from 0.05 weight percent to 0.5 weight percent, based on the total weight of the composition.

The compositions of this invention can optionally contain reinforcement material, such as glass in the form of fibers or beads. It is also within the scope of this invention that the composition contain mineral fillers, such as silica, clay, talc, calcium carbonate, and the like or other conventional fillers. Additional reinforcers, fillers, antioxidants, ultraviolet absorbers, coloring agents, pigments, lubricants, flame retardants, foaming agents and other additives can be added to the compositions of the present invention. Specific examples of the additives which can be added in the composition of the present invention are described in "Handbook of Additives, Chemicals to Rubbers and Plastics", published by Rubber Digest Co., Ltd, Japan in 1974.

Many suitable methods of combining the components are well known to those skilled in the art. For example, the components can be mixed together at room temperature in a rotating drum blender, or in an intensive mixer such as a Henschel mixer, to form a homogeneous mixture of the components. The homogeneous mixture is then melt blended by heating the mixture to a temperature above the melting point of the poly(arylene sulfide) resin and subjecting the mixture to further blending. A particularly suitable technique for melt blending the mixture is to pass the mixture through an extruder at a temperature in the range of from about 300° C. to about 330° C. The extrudate can be pelletized or formed into strands, sheets or tapes whereby it can best be used for forming molded products therefrom, e.g., by injection molding, press molding, etc.

In one embodiment, the poly(arylene sulfide) resin and metal hydroxide are mixed together followed by melt blending in an extruder at a temperature in the range of from about 300° C. to about 330° C. The poly(arylene sulfide)/metal hydroxide extrudate is dried for about 5 hours to about 30 hours at a temperature from about 100° C. to about 200° C. The dried extrudant is then mixed with the polymeric rubber and the carboxylic anhydride and the resulting mixture is melt blended in an extruder as previously described.

EXAMPLES

EXAMPLE I

NMP Quenched Acid Washed PPS

An aqueous solution of sodium sulfide was made in a steam-jacketed, stirred reactor by mixing 72.6 pounds of 49.52% sodium hydroxide solution and 88.1 pounds of a solution containing 58.85 weight percent sodium hydrosulfide and 0.14 weight percent sodium hydroxide. This solution was heated to about 240° F. before transferring to a second stirred reactor fitted with a distillation column. This reactor contained 18.7 gallons NMP and 23 pounds sodium acetate and had been deaerated by three sequential vents to 0 psig following pressurization to 150 psig with nitrogen. The transfer of aqueous sodium sulfide solution was followed by a flush of the steam-jacketed reactor and transfer line with 18.0 gallons of NMP. The resulting mixture was then heated to 310° F. under about 4 psig pressure, at which time column reflux had been established and water take off from the top of the column was started. Water removal, dehydration, was stopped after 91 minutes when the reactor temperature had reached 405° F.

Molten dichlorobenzene (DCB) in the amount of 135.4 pounds was pressured into the reactor within about 10 minutes after closing off the distillation column. The entire mixture was first heated to 440° F. and held at this temperature for 4 hours. At this point, 3 pounds of water were pressured into the reactor. The reaction mixture was then heated to 508° F. and held there for 3 hours. Following this, the reaction mixture was cooled to 400° F. at which point 20 gallons of NMP were added. Cooling was continued to about 220° F. at which point the polymer product was transferred to a slurry tank. The previous vessel and lines were then flushed with 40 gallons of NMP into the slurry tank at 194° F. The dried, salt-filled PPS was first washed with 120 gallons of city water at ambient temperature and then followed by a wash with 80 gallons of city water at 350° F. with a 180° F. deionized water rinse on the filter. The filter cake was then dried at 200°–300° F. under atmospheric pressure for about 3 hours.

About 85 pounds of polymer prepared as indicated above were put into a hot wash stirred tank with 80 gallons of deionized water containing 100 ml of glacial acetic acid. The wash slurry was heated to about 210° F. with vent valve open so that air could escape as the water boiled, and then the vent was closed and heating continued to 350° F. and held at this temperature for 30 minutes before cooling. When the PPS slurry reached 120° F., it was filtered using 180° F. deionized water rinse on the filter cake.

The wet filter cake was taken back for a second hot wash with deionized water using the same wash procedure and filtration. The filter cake was dried at 200°–300° F. for 3 hours at atmospheric pressure.

EXAMPLE II

The NMP quenched, acid washed PPS having a melt flow of 88 g/10 rain described in Example I was then used to blend with ethylene-propylene diene monomer (EPDM) elastomer, maleic anhydride and calcium hydroxide. Flow rate was determined by ASTH D1238-70, Procedure B at 600° F. (316° C.) using a 5 kg weight and a 0.17 mm diameter orifice.

Two blending processes were employed in this experiment. The first was a one-step process whereby all ingredients (Table I) were added to a 2-gallon polyethylene bag. Air was blown into the bag so that the bag could be and was shaken vigorously for 5 minutes to obtain a thorough mixture.

The mixture was then melt blended by feeding to a twin screw extruder (ZSK-30) fitted with a general purpose mixing screw configuration. The heating barrel was heated at 309° C. and die at 309° C. The screw speed was 60 rpm. The extrudates were dried for 16 hours at 120° C.

The dried extrudates were then subject to injection molding in an injection molder (Arbur ECO 305) with an appropriate injection pressure to fill tensile and flexural test specimens. The test specimens were then annealed at 204° C. (400° F.) for 2 hours.

In a two step blending process, PPS and calcium hydroxide were mixed in a plastic bag to obtain a thorough mixing followed by melt blending in a twin screw extruder as described above. The extrudates, after drying for 16 hours at 108° C., were then mixed with EPDM elastomer and maleic anhydride in the same manner. The mixture was again melt-blended by extrusion followed by drying.

The dried extrudates obtained from this two step mixing process were also subject to injection molding followed by annealing, as described above, to obtain flex bars. Notched izod was measured, according to ASTM test method D256-88, Procedure A, for these flex bars. The results are shown in Table I.

TABLE I

| Run No. | Blending | PPS | Ca(OH)$_2$ | Maleic anhydride | EPDM elastomer | Notched izod (ft-lb/in) |
|---|---|---|---|---|---|---|
| 1 | one-step | 796 | 0 | 4 | 200 | 2.1 |
| 2 | one-step | 794 | 2 | 4 | 200 | 2.1 |
| 3 | one-step | 794 | 2 | 4 | 200 | 2.2 |
| 4 | two-step | 794 | 2 | 4 | 200 | 10.8 |
| 5[a] | two-step | 794 | 2 | 4 | 200 | 7.9 |

[a]The PPS used was acid washed with hot acetic acid (177° C.)

It should be noted that run 1 shown in Table I, though a one-step mixing, is a control for both one-step and two-step processes because without Ca(OH)$_2$, there is no difference between one-step and two-step processes. As the results indicate, the notched izod is 2.1 ft-lb/in for bars made without Ca(OH)$_2$, with little or no increase in notched izod for bars made from the blends prepared by one-step blending (runs 2 and 3). However, the notched izod for bars made from blends prepared by two-step blending (runs 4 and 5) increase to 10.8 and 7.9 it-lb/in. the discrepancy in runs 4 and 5 is that the PPS used in run 5 had been acid washed with 177° C. acetic acid whereas, that used in run 4 was washed with acetic acid at ambient temperature.

The results shown in Table I clearly demonstrate that with acid washed PPS, Ca(OH)$_2$ addition to PPS compounds improves the PPS impact strength by a two-step blending process.

EXAMPLE III

Water Quenched, Calcium Acetate Washed PPS

An aqueous solution of sodium sulfide was made in a steam-jacketed, stirred reactor by mixing 71.6 pounds of 48.9 weight percent sodium hydroxide solution and 88.1 pounds of a solution containing 58.9 weight percent sodium hydrosulfide and 0.14 weight percent sodium hydroxide. This solution was heated to about 240° F. before transferring to a second stirred reactor fitted with a distillation column. This reactor contained 18.7 gallons NMP and 23 pounds sodium acetate and had been deaerated by three sequential vents to 0 psig following pressurization to 150 psig with nitrogen. The transfer of aqueous sodium sulfide solution was followed by a flush of the steam-jacketed reactor and transfer line with 18.0 gallons of NMP. The resulting mixture was then heated to 310° F. under about 6 psig pressure over a period of 43 minutes, at which time column reflux had been established and water take off from the top of the column was started. Water removal, dehydration, was stopped after 79 minutes when the reactor temperature had reached 410° F.

Molten DCB in the amount of 136.4 pounds was pressured into the reactor within about 10 minutes after closing off the distillation column. The entire mixture was first heated to 440° F. and held at this temperature for 4 hours before increasing the temperature to 509° F. for a second hold time of 3 hours. Following this, the reaction mixture was cooled to 300° F. at which point 10 gallons of water were added, dropping the temperature to 251° F. This mixture was then transferred from the reaction vessel to a slurry tank, followed by a 60 gallon water rinse of the reaction vessel and transfer lines into the slurry tank at 194° F. The dried, salt-filled PPS was first washed with 120 gallons of city water at ambient temperature and then followed by a wash with 80 gallons of city water at 350° F. with a 180° F. deionized water rinse on the filter. The filter cake was then dried at 200°-300° F. under atmospheric pressure for about 3 hours. About 85 pounds of polymer prepared as indicated above were put into a hot wash stirred tank with 80 gallons of water containing 176 g of calcium acetate (Ca(C$_2$H$_3$O$_2$)$_2$.H$_2$O).

The wash slurry was heated to about 210° F. with vent valve open so that air could escape as the water boiled, and then the vent valve was closed and heating continued to 350° F. and held at this temperature for 30 minutes before cooling. When the PPS slurry reached 120° F., it was filtered using 180° F. deionized water rinse on the filter cake.

The wet filter cake was taken back for a second hot wash with calcium acetate (176 g of Ca(C$_2$H$_3$O$_2$)$_2$.H$_2$O in 80 gallons of water) using the same wash procedure and filtration. The filter cake was dried at 200°-300° F. for 3 hours at atmospheric pressure.

EXAMPLE IV

This example illustrates that the invention also works well for water quenched, calcium acetate washed PPS.

The experiments were carried out as those described in Example II with the exception that the PPS used was water quenched, calcium acetate washed having a flow rate of 64 g/10 rain (determined by the same ASTM procedure as Example II). The results are shown in Table II.

TABLE II

| Run No. | Blending | PPS | Ca(OH)$_2$ | Maleic anhydride | EPDM elastomer | Notched Izod (ft-lb/in) |
|---|---|---|---|---|---|---|
| 6 | one-step | 796 | 0 | 4 | 200 | 2.6 |
| 7 | one-step | 794 | 2 | 4 | 200 | 7.7 |
| 8 | one-step | 794 | 2 | 4 | 200 | 8.4 |
| 9 | two-step | 794 | 2 | 4 | 200 | 7.9 |

The results show that control flex bar made from water quenched, calcium acetate washed PPS blends (run 6) has a slightly higher notched izod (2.6 ft-lb/in) than that made from NMP quenched acid washed (run 1, 2.1 ft-lb/in). The results also indicate that bars made from blends prepared by one-step (run 7) and two-step (run 9) processes have a very similar improvement in impact strength (7.7 ft-lb/in and 7.9 ft-lb/in, respectively). Table II further demonstrates that Ca(OH)$_2$ has a more profound effect in a one-step blending process on the impact strength of flex bars made from water quenched, calcium acetate washed PPS (comparing runs 7 and 8 in Table II with runs 2 and 3 in Table I). Run 8 was a repeated experiment of run 7.

It is concluded that Ca(OH)$_2$ significantly improves impact strength of PPS compositions.

That which is claimed is:

1. A composition comprising poly(arylene sulfide), a polymeric rubber, a metal hydroxide, and a carboxylic anhydride selected from the group consisting of carboxylic anhydrides having about 3 to 10 carbon atoms with at least one olefinic unsaturation and derivatives thereof, and wherein said poly(arylene sulfine) is a water quenched and calcium acetate washed resin.

2. A composition as recited in claim 1 wherein said poly(arylene sulfide) is present in an amount of from about 0.5 weight percent to about 99.5 weight percent based on the total weight of the composition, said polymeric rubber is present in an amount from about 0.1 weight percent to about 99.5 weight percent based on the total weight of the composition, said metal hydroxide is present in an amount from about 0.001 weight percent to about 5 weight percent based on the total weight of the composition, and said carboxylic anhydride is present in an amount from about 0.5 weight percent to about 5 weight percent based on the total weight of the composition.

3. A composition as recited in claim 2 wherein said metal hydroxide is present in an amount from about 0.01 weight percent to about 2 weight percent.

4. A composition as recited in claim 3 wherein said metal hydroxide is present in an amount from 0.05 weight percent to 0.5 weight percent.

5. A composition as recited in claim 1 wherein said metal of said metal hydroxide is chosen from the group of monovalent metals of Periodic Group IA, polyvalent metals of Periodic Group IIA and mixtures of two or more thereof.

6. The composition as recited in claim 1 wherein said metal of said metal hydroxide is chosen from the group consisting of polyvalent metals of Periodic Group IIA.

7. A composition as recited in claim 1 wherein said poly(arylene sulfide) is poly(phenylene sulfide), said polymeric rubber is ethylene-propylene tarpolymer, and said carboxylic anhydride is maleic anhydride.

8. A composition according to claim 7 wherein said metal hydroxide is calcium hydroxide.

9. A composition according to claim 8 wherein said poly(phenylene sulfide) is present in an amount from about 0.5 to about 99.5 weight percent based on the total weight of the composition, said ethylene-propylene tarpolymer is present in an amount from about 0.1 to about 99.5 weight percent based on the total weight of the composition, said calcium hydroxide is present in an amount from about 0.001 weight percent to about 5 weight percent based on the total weight of the composition, and said maleic anhydride is present in an amount from about 0.5 weight percent to about 5 weight percent based on the total weight of the composition.

10. A composition according to claim 9 wherein said calcium hydroxide is present in an amount from about 0.01 weight percent to about 2 weight percent.

11. A composition according to claim 10 wherein said calcium hydroxide is present in the amount from 0.05 weight percent to 0.5 weight percent based on the total weight of the composition.

12. A composition according to claim 1 wherein said composition is formed by melt blending said poly(arylene sulfide), said polymeric rubber, said metal hydroxide, and said carboxylic anhydride.

13. A composition according to claim 12 wherein said metal hydroxide is calcium hydroxide.

14. A composition comprising poly(arylene sulfide), a polymeric rubber, a metal hydroxide, and a carboxylic anhydride selected from the group of carboxylic anhydrides having about 3 to 10 carbon atoms with at least one olefinic unsaturation and derivatives thereof, and wherein said poly(arylene sulfide) is a NMP quenched and acid washed resin.

15. A composition according to claim 12 wherein said composition is formed by combining said poly(arylene sulfide) with said metal hydroxide to form a first mixture, melt blending said first mixture to form a first blend, combining said first blend with said polymeric rubber and said carboxylic anhydride to form a second mixture, and melt blending said second mixture to form said composition.

16. A composition according to claim 14 wherein said metal hydroxide is calcium hydroxide.

* * * * *

UNITED STATES PATENT AND TRADEMARK OFFICE
CERTIFICATE OF CORRECTION

PATENT NO. : 5,350,806

DATED : September 27, 1994

INVENTOR(S) : Michael C. Yu and William H. Beever

It is certified that error appears in the above-identified patent and that said Letters Patent is hereby corrected as shown below:

Column 9, claim 1, line 1, delete "poly(arylene sulfine)" and insert ---poly(arylene sulfide)---.

Column 9, claim 7, line 32, delete "tarpolymer" and insert ---terpolymer---.

Column 10, claim 9, line 1, delete "tarpolymer" and insert ---terpolymer---.

Signed and Sealed this

Twenty-ninth Day of April, 1997

Attest:

BRUCE LEHMAN

Attesting Officer

Commissioner of Patents and Trademarks